United States Patent [19]
Karasawa

[11] Patent Number: 5,483,389
[45] Date of Patent: Jan. 9, 1996

[54] REPRODUCING APPARATUS FOR TEMPORARILY WRITING REPRODUCING DATA INTO MEMORY

[75] Inventor: Katsumi Karasawa, Tokyo, Japan

[73] Assignee: Canon Kabushiki Kaisha, Tokyo, Japan

[21] Appl. No.: 261,303

[22] Filed: Jun. 16, 1994

Related U.S. Application Data

[63] Continuation of Ser. No. 170,640, Dec. 21, 1993, abandoned, which is a continuation of Ser. No. 720,726, Jun. 25, 1991, abandoned.

[30] Foreign Application Priority Data

Jun. 28, 1990 [JP] Japan ................................ 2-168514

[51] Int. Cl.$^6$ .............................. G11B 5/09; G11B 15/14
[52] U.S. Cl. ................................................ 360/53; 360/64
[58] Field of Search ................................ 360/53, 48, 32, 360/40, 64, 72.2, 38.1, 72.1; 369/32

[56] References Cited

U.S. PATENT DOCUMENTS 4,862,297  8/1989  Fukami et al. ........................... 360/53
5,124,851  6/1992  Masui et al. ............................. 360/53

Primary Examiner—Ali Neyzari
Attorney, Agent, or Firm—Fitzpatrick, Cella, Harper & Scinto

[57] ABSTRACT

In an apparatus for reproducing main information data from a recording medium on which data train including the main information data, address data, and error correction data for an error correction have been recorded, the main information data in the data train reproduced by reproducing heads to trace on a recording medium is written into a memory in accordance with the address data in the data train and an access timing of an error correction circuit to the memory and a main information data reading timing from the memory are determined in accordance with the address data in the data train, thereby preventing a competition of addresses in the memory irrespective of the conditions such as a conveying speed of the recording medium upon reproduction and the like.

17 Claims, 9 Drawing Sheets

| SYNC | ID | DATA | PARITY |
|------|----|----|--------|

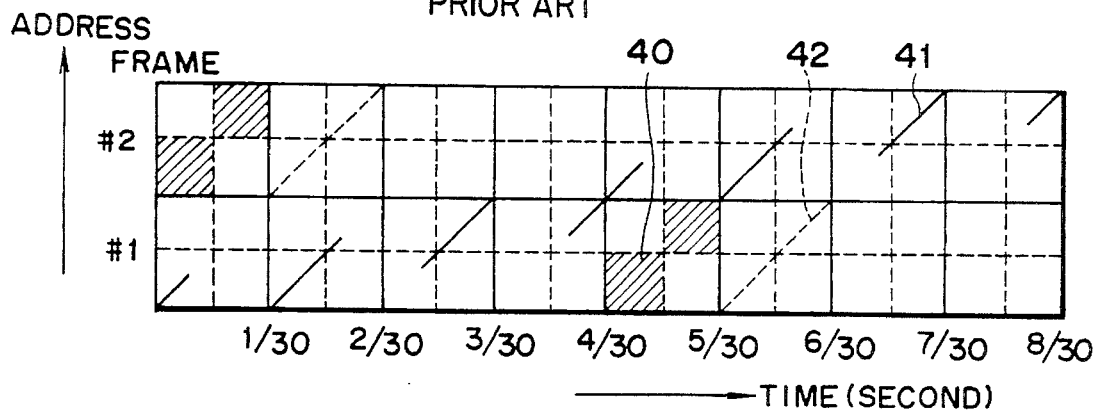
FIG. 7A PRIOR ART
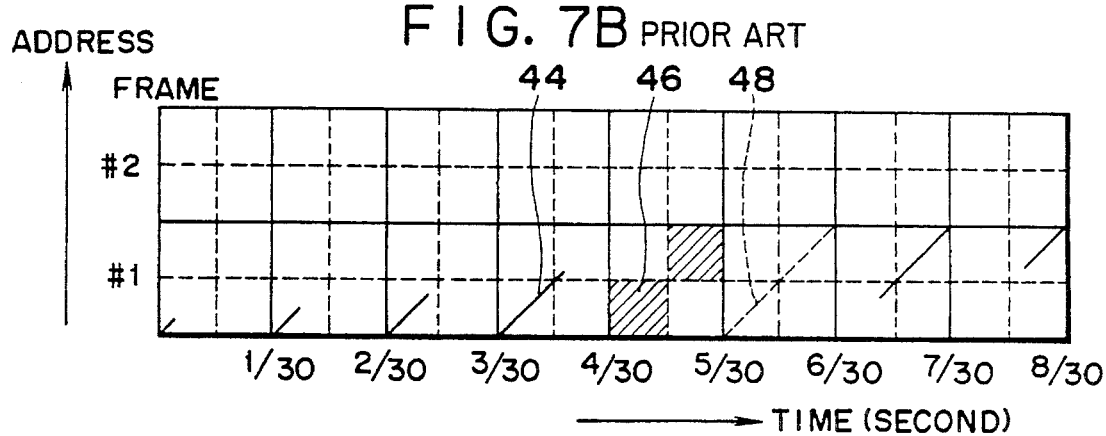
FIG. 7B PRIOR ART
FIG. 7C PRIOR ART
ERROR CORRECTION
ACTIVATION
FIG. 7D PRIOR ART
DATA READ-OUT

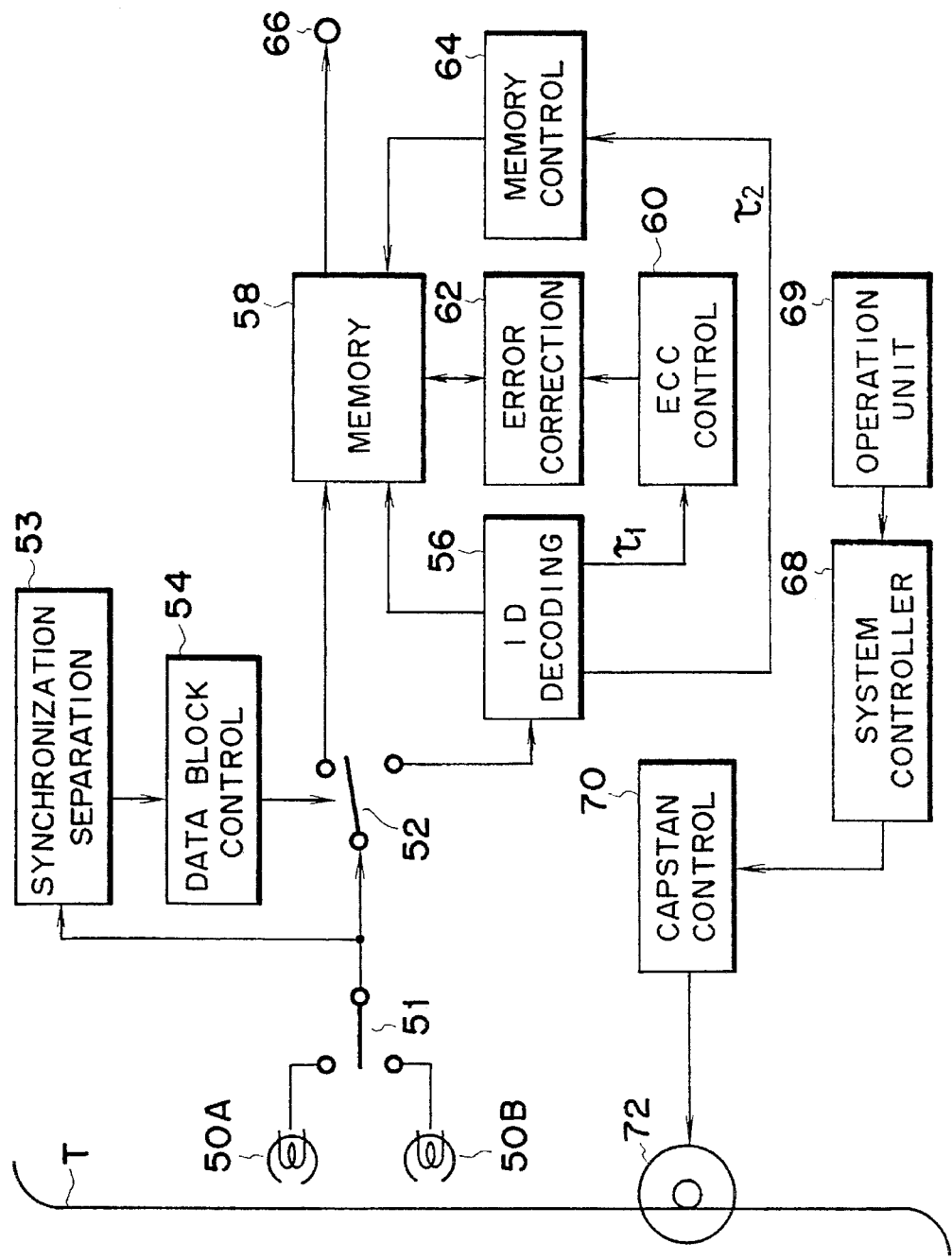

REPRODUCING APPARATUS FOR TEMPORARILY WRITING REPRODUCING DATA INTO MEMORY

This application is a continuation of application Ser. No. 08/170,640 filed Dec. 21, 1993, which was a continuation of application Ser. No. 07/720,726 filed Jun. 21, 1991, both now abandoned.

BACKGROUND OF THE INVENTION

1. Field of the Invention

The present invention relates to a reproducing apparatus and, more particularly, to a reproducing apparatus for temporarily writing reproduced data into a memory and for subsequently reading out the data from the memory.

2. Related Background Art

A digital VTR has been known as a reproducing apparatus for temporarily writing reproduced data into a memory and for subsequently reading out the data from the memory as mentioned above.

In the digital VTR, generally, a sync code SYNC, address data ID, and an error correction parity code PARITY to detect and correct a transmission error are added to video data DATA of a predetermined unit quantity to be recorded, thereby forming a sync block as shown in FIG. 1. A rotary drum 12 having two heads 10A and 10B of different azimuths as shown in, e.g., FIG. 2 is rotated and a data train including video data is recorded onto a magnetic tape on a sync block unit basis by the heads 10A and 10B.

FIG. 3 shows an example of a recording format on the tape. In FIG. 3, it is assumed that a signal of one field can be recorded by one track. $A_1, A_2, \ldots, A_n, B_1, B_2, \ldots, B_n$ denote sync blocks shown in FIG. 1. One track is formed by n sync blocks $A_1$ to $A_n$ or $B_1$ or $B_n$. The track comprising n sync blocks $A_1$ to $A_n$ is recorded by the magnetic head 10A. The track including n sync blocks $B_1$ to $B_n$ is recorded by the magnetic head 10B. That is, the above tracks are alternately recorded with different azimuth angles.

FIG. 4 shows a trace locus of the head having the same azimuth angle as that of a certain track in the case where the data train including the video data recorded as shown in FIG. 3 have been reproduced at a speed ¼ of the normal reproducing speed for such a track. It is now assumed that an area in which 50% or more of the track is being traced by the head of the same azimuth is set to a reproducible area. In FIG. 4, the hatched area is the reproducible area.

FIG. 5 is a block diagram showing a circuit construction of a main section of the reproducing system of the conventional digital VTR. Outputs of the heads 10A and 10B are supplied to an input terminal 20 and are separated to the video data and the address data ID by a switch 22 and a data block control circuit 24. An ID decoding circuit 26 decodes the separated address data ID and generates a write address to a memory 28. The separated video data is stored in the memory 28 in accordance with a write address from the ID decoding circuit 26. In the ¼ time speed reproducing mode, the same track is traced a plurality of number of times as shown in FIG. 4, so that the overlapped data is written into the memory 28. FIG. 6 diagrammatically shows a change in write address into the memory 28 in the ¼ time speed reproducing mode. A solid line 14 indicates a write address.

Doubling speed information, that is, information of a reproducing speed magnification is supplied to an input terminal 30. An ECC control circuit 32 makes an error correction circuit 34 operative in accordance with the doubling speed information. It is now assumed that an error detection and correction code form called a product code for a data matrix including a plurality of sync blocks shown in FIG. 1 is used and that the data matrix is formed on a track (field) unit basis upon recording. That is, since the error detection and correction code has been formed on a field unit basis, upon error correction by the error correction circuit 34, processes are executed on a field unit basis as shown by hatched regions 16 in FIG. 6. Thus, access addresses into the memory 28 of the error correction circuit 34 are also designated on a field unit basis. The actual access address changes in each field every 1/60 second. On the other hand, a memory control circuit 36 controls the reading operation from the memory 28 in accordance with the doubling speed information from the input terminal 30. Practically speaking, the read addresses are generated at timings shown by broken lines 18 in FIG. 6. The data which has been read out of the memory 28 is supplied to an external circuit from an output terminal 38.

In the above conventional example, in the case of the ¼ time speed reproduction, as shown in FIG. 7A, an address 41 to write the data, an address 40 for the error detecting and correcting process, and an address 42 to read out the data must be constructed so as not to compete with each other. For this purpose, the error correction activation timing and the data reading activation timing are set as shown in FIGS. 7C and 7D, respectively.

However, when the reproducing speed is slowed further, for instance, in the case of the ⅛ time speed as shown in FIG. 7B, if the activation timings shown in FIGS. 7C and 7D are used, an error detection and correction address 46 and a data read address 48 compete with a data write address 44. Therefore, in the case of a ⅛ time speed, the error correction activation timing and the .data reading activation timing must be set as shown in FIGS. 8A to 8C, respectively.

As mentioned above, in the conventional example, it is impossible to flexibly cope with the reproducing speed. Particularly, in the case where the reproducing speed is not a fraction of an integer of the normal reproducing speed, it is difficult to determine the timing to activate the error correction and the timing to activate the data reading. Further, in the case where a tracking state is not in a prescribed state or the like, there is a case where competition of the access addresses in the respective sections as mentioned above occurs.

SUMMARY OF THE INVENTION

With such a background, it is an object of the invention to provide a reproducing apparatus in which the competition of access addresses into a memory doesn't occur irrespective of a reproducing speed.

Another object of the invention is to provide a reproducing apparatus which can certainly execute a correcting process of a code error irrespective of a reproducing speed.

To accomplish the above objects, according to the invention, as an embodiment, there is disclosed a reproducing apparatus for reproducing main data from a recording medium on which a data train including the main data, address data, and error correction data for an error correction have been recorded. The reproducing apparatus includes comprising: (a) a reproducing head to trace on the recording medium; (b) an extracting unit for extracting the address data from the data train reproduced by the reproducing head; (c) a memory to store the main data in the data train in accordance with the address data extracted by the extracting means; (d) an error correcting unit for correcting a code error of the main data stored in the memory by using the error correction data in the data train; and (e) a timing control unit for determining an access timing of the error correcting unit to the memory in accordance with the address data extracted by the extracting unit.

The above and other objects and features of the present invention will become apparent from the following detailed description and the appended claims with reference to the accompanying drawings.

BRIEF DESCRIPTION OF THE DRAWINGS

FIGS. 7A to 7D are diagrams for explaining access timings and access addresses to the memory in the case where the reproducing mode is switched from the ¼ time speed reproducing mode to the ⅛ time speed reproducing mode in the digital VTR of FIG. 5;

FIG. 9 is a block diagram showing a construction of a main section of a reproducing system of the digital VTR according to an embodiment of the invention;

DETAILED DESCRIPTION OF THE PREFERRED EMBODIMENTS

An embodiment of the invention will be described hereinbelow with reference to the drawings.

Figure 10:
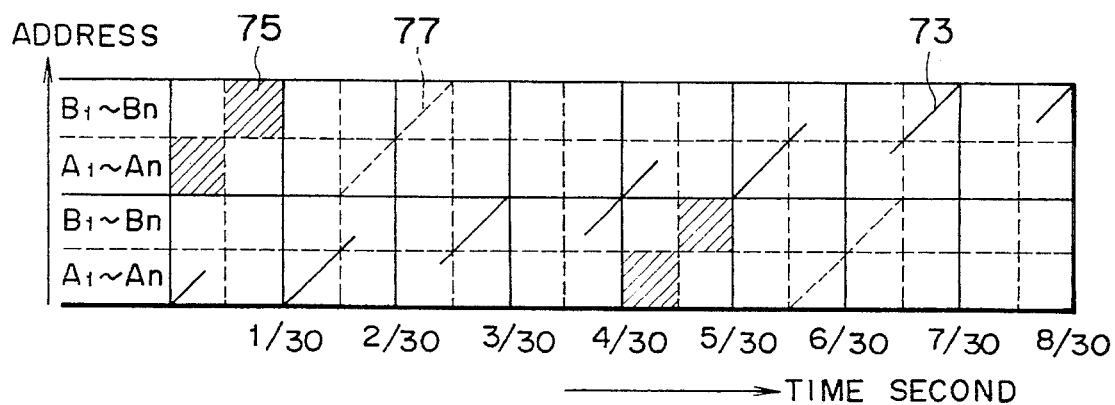
FIG. 10 is a diagram schematically showing access addresses to the memory in the ¼ time speed reproducing mode in the digital VTR of FIG. 9.
Figure 11:
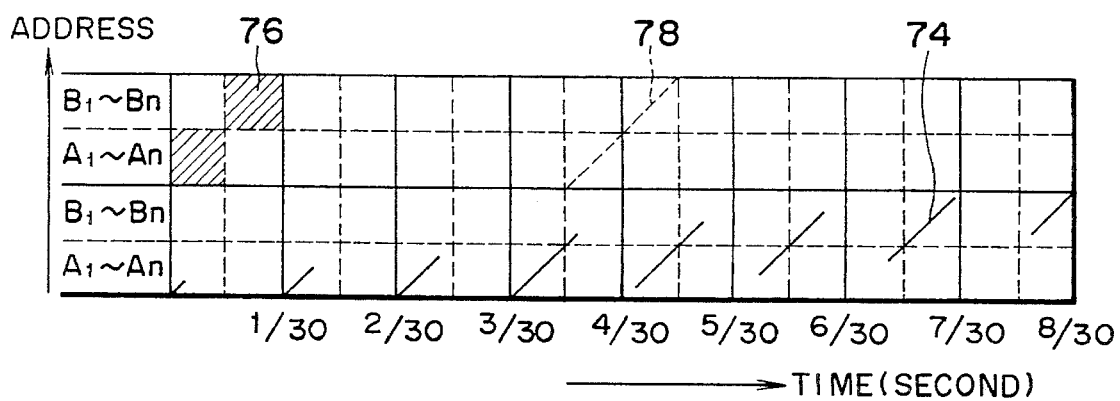
FIG. 11 is a diagram schematically showing access addresses to the memory in the ⅛ time speed reproducing mode in the digital VTR of FIG. 9.

FIG. 9 is a block diagram showing a construction of a reproducing system of a digital VTR according to an embodiment of the invention. FIG. 10 is a diagram schematically showing a change in access address to a memory 58 in the case of a ¼ time speed reproducing mode. FIG. 11 is a diagram schematically showing a change in access address to the memory 58 in the case of the ⅛ time speed reproducing mode.

Figures 1, 2:
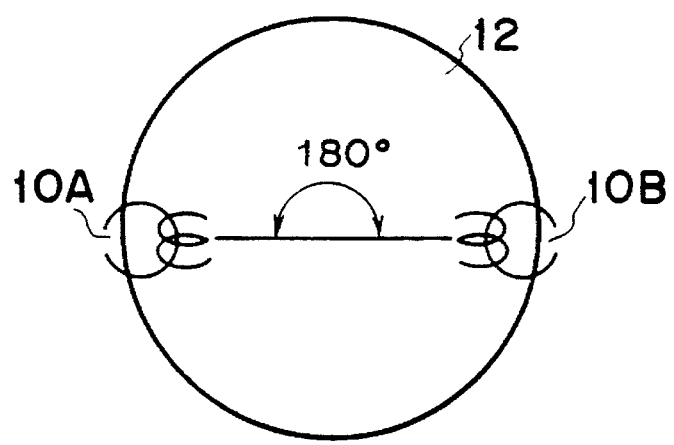
FIG. 1 is a diagram showing a general construction of a sync block of a digital VTR.
FIG. 2 is a diagram showing an arrangement of rotary heads on a rotary drum.
Figure 3:
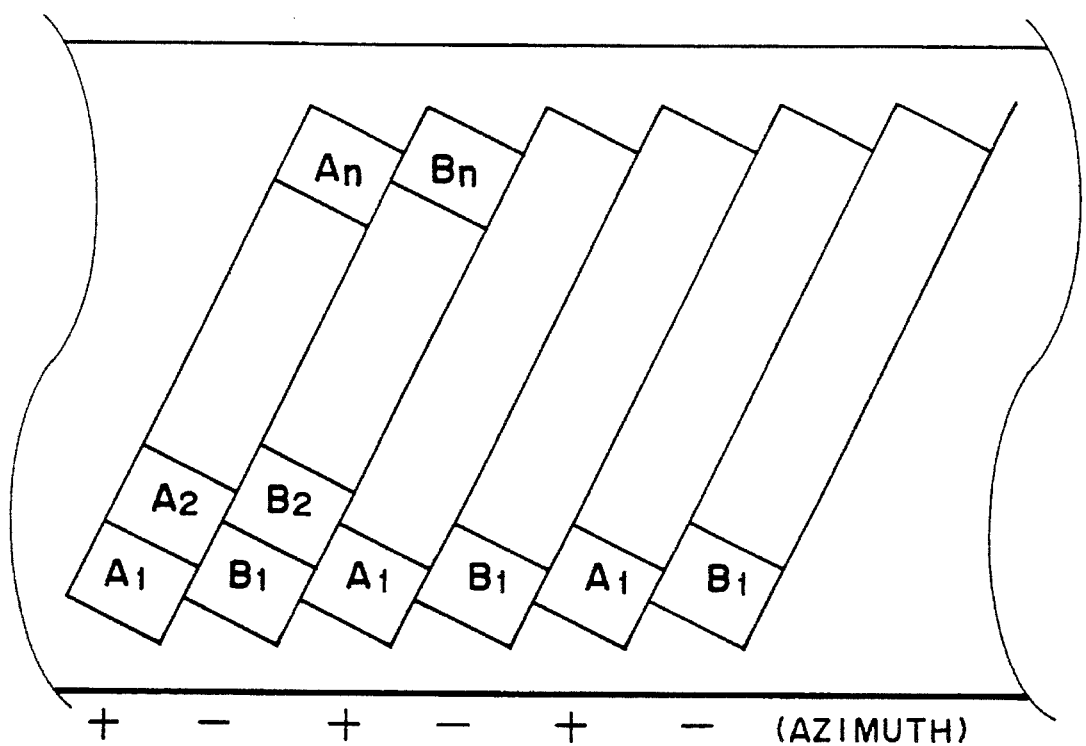
FIG. 3 is a diagram showing a general recording format on a tape of a digital VTR.
Figure 4:
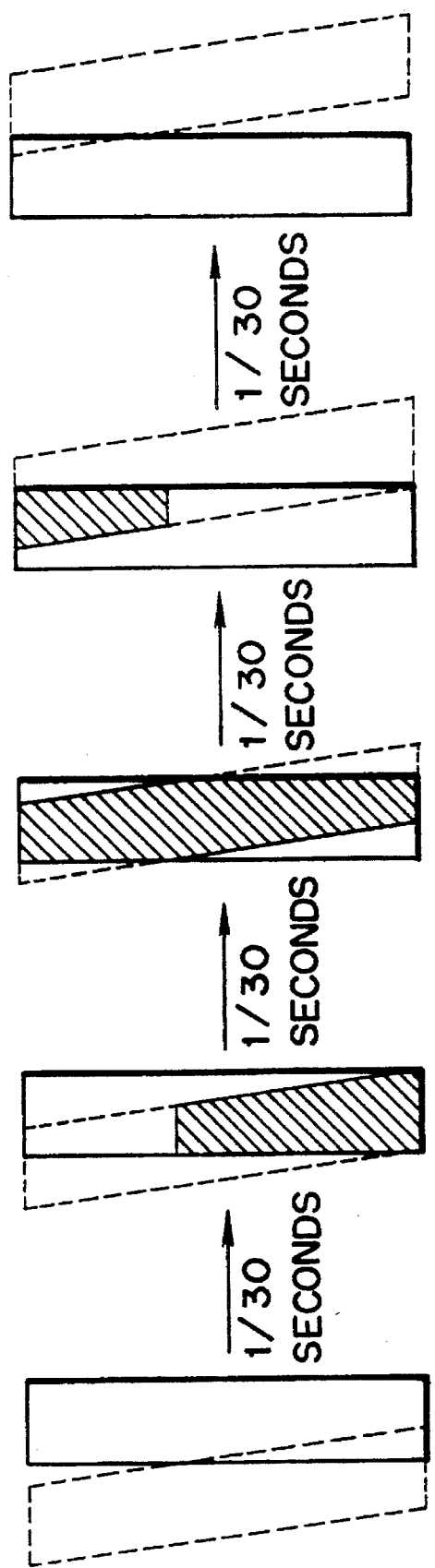
FIG. 4 is a diagram showing a tracing locus of the head for one tack which has been recorded by the format of FIG. 3.
Figure 5:
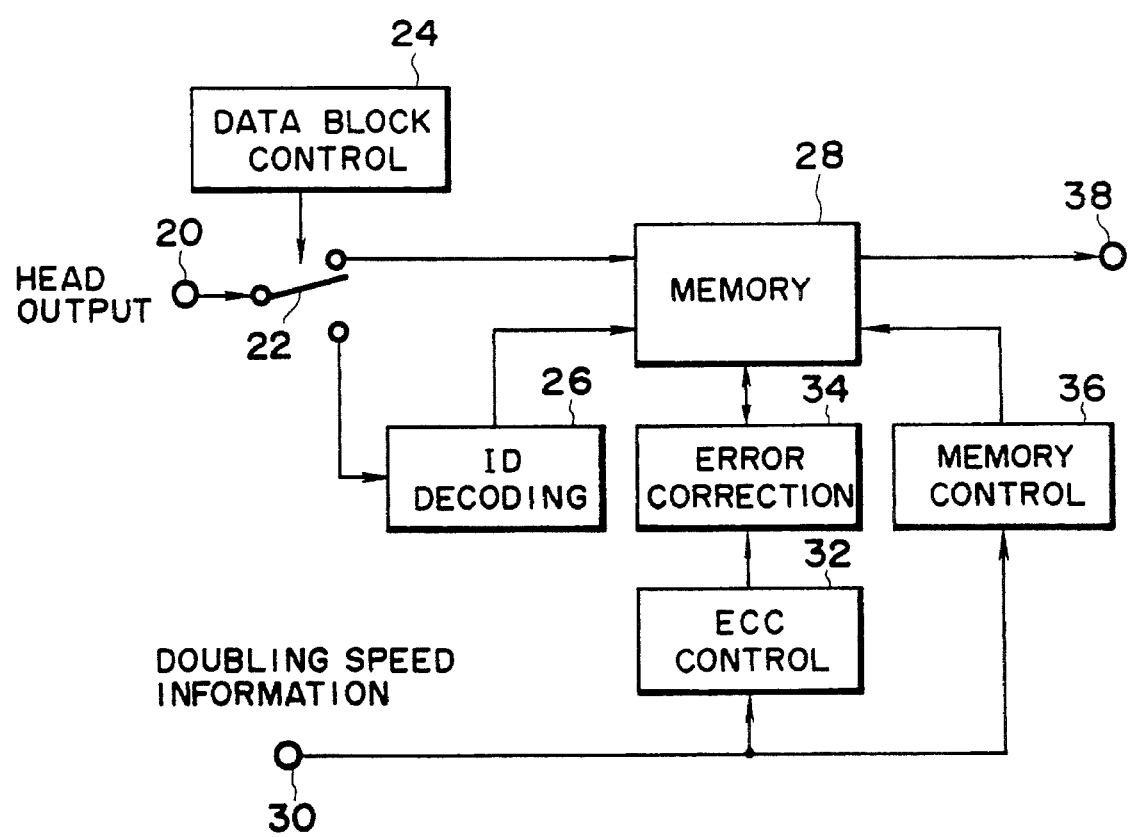
FIG. 5 is a block diagram showing a circuit construction of a main section in a reproducing apparatus of a conventional digital VTR.
Figure 6:
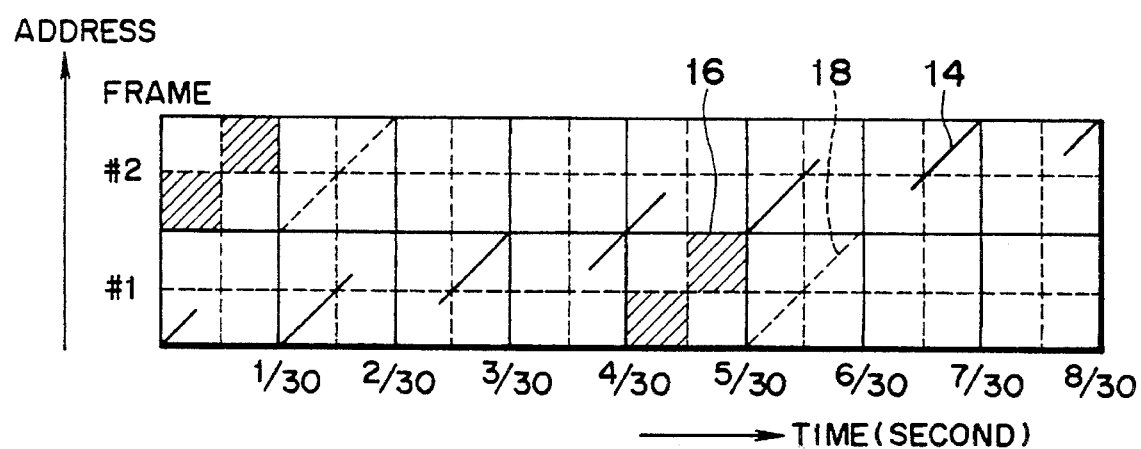
FIG. 6 is a diagram schematically showing access addresses into a memory in a ¼ time speed reproducing mode in the digital VTR of FIG. 5.
Figure 8A:
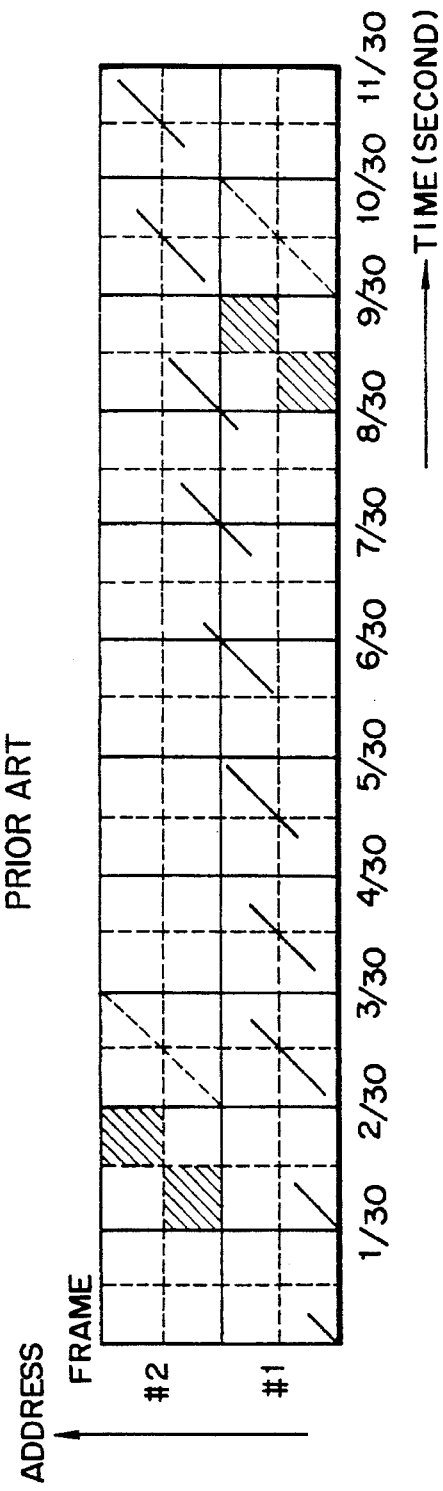
FIGS. 8A to 8C are diagrams schematically showing access addresses to the memory to be set in the ⅛ time speed reproducing mode in the digital VTR of FIG. 5.
Figure 8B:
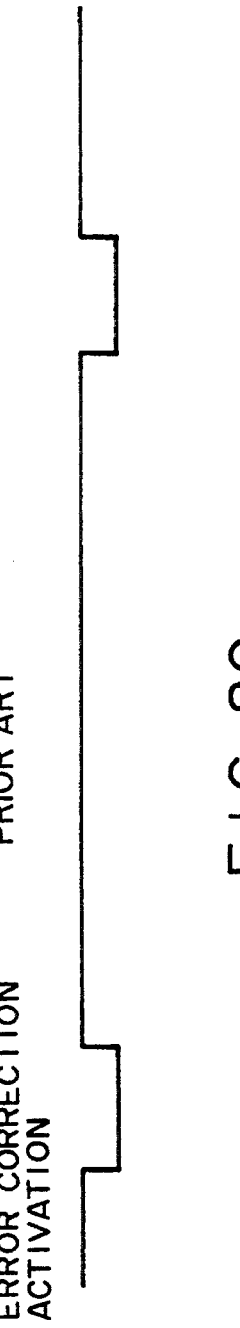
Figure 8C:

In FIG. 9, reference character T denotes a magnetic tape; reference numerals 50A and 50B indicate rotary heads having different azimuth angles which are arranged as shown in FIG. 2; 51 a switch to alternately generate reproduction outputs of the rotary heads 50A and 50B every ¹⁄₆₀ second; 53 a synchronization separation circuit to separate the sync code SYNC shown in FIG. 1 from the output of the switch 51; and 54 a data block control circuit to generate a control signal to control a switch 52 in accordance with the sync code SYNC which is generated from the sync separation circuit 53.

The reproduction signals of the heads 50A and 50B are separated into the video data, the error correction parity code, and the address data ID by the switch 52 and the data block control circuit 54. An ID decoding circuit 56 decodes the separated address data ID and generates a write address in the memory 58. The separated video data is stored in the memory 58 in accordance with the write address from the ID decoding circuit 56.

The ID decoding circuit 56 generates a timing signal $\tau_1$ to control a timing to activate the error detecting and correcting process and a timing signal $\tau_2$ to control a timing to start the reading operation of the memory 58 and a timing to set an initial read address in accordance with the input address data ID. The timing signal $\tau_1$ is supplied to an ECC control circuit 60. The timing signal $\tau_2$ is supplied to a memory control circuit 64. A practical example will now be shown. When the video data of the sync block $A_1$ is first written into the memory 58, the ID decoding circuit 56 supplies the activation timing signal for the error detection and correction to the ECC control circuit 60. When the video data of the sync block $B_1$ is first written into the memory 58, the ID decoding circuit 56 supplies the activation timing signal to read the data to the memory control circuit 64.

The ECC control circuit 60 activates the error correction circuit 62 in response to the activation timing signal $\tau_1$ for the error detection and correction, thereby accessing to the memory 58 on a field unit basis and executing the error detecting and correcting process. The memory control circuit 64 starts the reading operation of the data stored in the memory 58 on a frame unit basis in response to the activation timing signal $\tau_2$ to read the data. The data which has been read out of the memory 58 is sent from an output terminal 66 to an external circuit.

A system controller 68 allows a capstan control circuit 70 to control a rotational speed of a capstan 72 in accordance with a manual operation of an operation unit 69. In the embodiment, it is assumed that the rotational sped of the capstan 72, namely, the conveying speed of the tape T can be variably set to a value within a range from ¹⁄₅₀ times to i times the speed of recording.

In the case of the ¼ time speed reproducing mode in which the capstan 72 is rotated at a speed which is ¼ time as fast as the speed of recording, the ID decoding circuit 56 generates a write address as shown by a solid line 73 in FIG. 10 and supplies it to the memory 58. The error correction circuit 62 executes the error detecting and correcting process at a timing shown in a hatched region 75 in FIG. 10. The memory control circuit 64 reads out the data at a timing shown by a broken line 77 in FIG. 10.

In the case of the ⅛ time speed reproduction in which the capstan 72 is rotated at a speed of ⅛ the speed upon recording, the ID decoding circuit 56 generates a write address as shown by a straight line 74 in FIG. 11 and supplies it to the memory 58. The error correction circuit 62 executes the error detecting and correcting process at a timing shown in a hatched region 76 in FIG. 11. The memory control circuit 64 reads the data at a timing shown by a broken line 78 in FIG. 11. As will be understood from FIG. 11, the competition of the access addresses as in the conventional apparatus doesn't occur.

Although the embodiment has been described with respect to the cases of the ¼ time speed reproduction and the ⅛ time speed reproduction, the competition of the addressing doesn't occur also in the cases of the other doubling speed reproduction. That is, even in the case where the reproducing speed is not a fraction of an integer of the ordinary reproducing speed, the access address for error correction, the data read address, and the like do not compete with the data write address due to the above embodiment.

In the above embodiment, the error correction has been activated upon writing of the sync block $A_1$ and the data reading operation has been activated upon writing of the sync block $B_1$. However, the relation between the activation timing and the address of the reproduced ID can be properly changed.

As will be easily understood from the above description, according to the invention, since the error detecting and correcting process or the data reading operation is activated in accordance with the address data ID of the sync block, the competition of the memory addressing can be avoided. Thus, it is possible to flexibly cope with the reproducing speed without changing the circuit construction and the control operation.

What is claimed is:

1. A reproducing apparatus for reproducing main information data from a recording medium on which a data train including the main information data, address data, and error correction data for an error correction has been recorded, comprising:
   (a) a reproducing head to trace on the recording medium;
   (b) extracting means for extracting the address data from the data train reproduced by said reproducing head;
   (c) a memory to store the main information data in the data train;
   (d) error correcting means for correcting a code error of the main data stored in the memory by using the error correction data in the data train; and
   (e) control means for determining both an access timing of the error correcting means to the memory and a storage address of the main information data into the memory in accordance with the address data extracted by the extracting means.

2. An apparatus according to claim 1, further comprising reading means for reading the main information data stored in the memory,
   and wherein the control means further determines a reading timing of the reading means in accordance with the address data extracted by the extracting means.

3. An apparatus according to claim 1, wherein the control means allows the error correcting means to start the access to the memory in accordance with that the address data extracted by the extracting means corresponds to a predetermined address in the memory.

4. An apparatus according to claim 3, wherein the address data is added every main information data of a predetermined amount and the error correcting means corrects the code error by using the main information data of a predetermined amount larger than the predetermined amount as one unit.

5. An apparatus according to claim 1, wherein the reproducing head includes a rotary head, the recording medium is a tape-like recording medium, and the data train have been recorded on a number of helical tracks formed on the tape-like recording medium.

6. An apparatus according to claim 5, further comprising:
   conveying means for conveying the tape-like recording medium; and
   speed switching means for switching a conveying speed of the tape-like recording medium by the conveying means.

7. An apparatus according to claim 6, wherein the reproducing head and the error correcting means can operate when the speed switching means sets the conveying speed of the tape-like recording medium to be slower than the speed upon recording of the data train.

8. A reproducing apparatus for reproducing main information data from a recording medium on which a data train including the main information data and address data has been recorded, comprising:
   (a) a reproducing head to trace on the recording medium,
   (b) extracting means for extracting the address data from the data train reproduced by the reproducing head;
   (c) a memory to store the main information data in the data train;
   (d) reading means for reading out the main information data stored in the memory; and
   (e) control means for determining both an access timing to the memory of the reading means and a storage address of the main information data into the memory in accordance with the address data extracted by the extracting means.

9. An apparatus according to claim 8, wherein the reproducing head includes a rotary head, the recording medium is a tape-like recording medium, and the data train have been recorded on a number of helical tracks formed on the tape-like recording medium.

10. An apparatus according to claim 9, further comprising:
    conveying means for conveying the tape-like recording medium; and
    speed switching means for switching a conveying speed of the tape-like recording medium by the conveying means.

11. An apparatus according to claim 10, wherein the reproducing head and the error correcting reading means can operate when the speed switching means sets the conveying speed of the tape-like recording medium to be slower than the speed upon recording of the data train.

12. An apparatus according to claim 8, wherein the control means allows the reading means to start an access to the memory in accordance with that the address data extracted by the extracting means corresponds to a predetermined address in the memory.

13. A reproducing apparatus for reproducing main information data from a recording medium on which a data train including the main data information and address data has been recorded, comprising:
    (a) a reproducing head to trace on the recording medium;
    (b) extracting means for extracting the address data from the data train reproduced by the reproducing head;
    (c) a memory to store the main information data in the data train;
    (d) accessing means for accessing the main information data stored in the memory in addition to writing of the main information data into the memory; and
    (e) control means for determining both an access timing to the memory of the accessing means and a storage address of the main information data into the memory in accordance with the address data extracted by the extracting means.

14. A data processing apparatus comprising:
    (a) input means for inputting a data train including main information data, address data, and error correction data;
    (b) extracting means for extracting the address data from the data train input by said input means;
    (c) memory means for storing the main information data in the data train;

(d) error correcting means for correcting a code error of the main information data stored in said memory means by using the error correction data in the data train; and (e) control means for determining both an access timing of the error correcting means to said memory means and a storage address of the main information data into said memory means in accordance with the address data extracted by said extracting means.

15. A data processing apparatus comprising:

(a) input means for inputting a data train including main information data and address data;

(b) extracting means for extracting the address data from the data train input by said input means;

(c) memory means for storing the main information data in the data train;

(d) reading means for reading out the main information data stored in said memory means; and (e) control means for determining both an access address to said memory means of said reading means and a storage address of the main information data into said memory means in accordance with the address data extracted by the extracting means.

16. A data processing apparatus comprising:

(a) input means for inputting a data train including main information data, address data, and error correction data;

(b) extracting means for extracting the address data from the data train input by said input means;

(c) memory means for storing the main information data in the data train;

(d) error correcting means for correcting a code error of the main information data stored in said memory means by using the error correction data in the data train; and (e) control means for determining both an access address into said memory means of said error correcting means and a storage address of the main information data into said memory means in accordance with the address data extracted by said extracting means.

17. A data processing apparatus comprising:

(a) input means for inputting a data train including main information data and address data;

(b) extracting means for extracting the address data from the data train input by said input means;

(c) memory means for storing the main information data in the data train;

(d) reading means for reading out the main information data stored in said memory means; and (e) control means for determining both an access address to the memory means of the reading means and a storage address of the main information data into said memory means in accordance with the address data extracted by said extracting means.

* * * * *

UNITED STATES PATENT AND TRADEMARK OFFICE
CERTIFICATE OF CORRECTION

PATENT NO. : 5,483,389

DATED : January 9, 1996

INVENTOR : KATSUMI KARASAWA

It is certified that error appears in the above-identified patent and that said Letters Patent is hereby corrected as shown below:

ON THE TITLE PAGE

[57] Abstract

Line 2, "data" should read --a data--.

COLUMN 2

Line 32, ".data" should read --data--;
   Line 60, "includes" should read --includes:--
   Line 61, "comprising:" should be deleted.

COLUMN 3

Line 19, "tack" should read --track--;
   Line 47, "EMBODIMENTS" should read --EMBODIMENT--.

COLUMN 4

Line 38, "sped" should read --speed--.

UNITED STATES PATENT AND TRADEMARK OFFICE
CERTIFICATE OF CORRECTION

PATENT NO. : 5,483,389

DATED : January 9, 1996

INVENTOR : KATSUMI KARASAWA

It is certified that error appears in the above-identified patent and that said Letters Patent is hereby corrected as shown below:

COLUMN 6

Line 32,   "error correcting" should be deleted.
   Line 43,   "data information" should read --information data--.

COLUMN 7

Line 4,   "timing" should read --address--.

Signed and Sealed this

Eleventh Day of June, 1996

Attest:

BRUCE LEHMAN

*Attesting Officer*     *Commissioner of Patents and Trademarks*